United States Patent
Sun et al.

(10) Patent No.: US 11,400,594 B2
(45) Date of Patent: Aug. 2, 2022

(54) ZERO TEACH FOR ROBOTIC CONTINUOUS PATH

(71) Applicant: Fanuc America Corporation, Rochester Hills, MI (US)

(72) Inventors: Yi Sun, Bloomfield Hills, MI (US); Sai-Kai Cheng, Rochester Hills, MI (US); Jason Tsai, Bloomfield Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 235 days.

(21) Appl. No.: 16/566,608

(22) Filed: Sep. 10, 2019

(65) Prior Publication Data

US 2020/0078945 A1    Mar. 12, 2020

Related U.S. Application Data

(60) Provisional application No. 62/729,179, filed on Sep. 10, 2018.

(51) Int. Cl.
 *B25J 9/16* (2006.01)
 *B25J 9/00* (2006.01)
 *G06T 19/00* (2011.01)

(52) U.S. Cl.
 CPC .......... *B25J 9/1671* (2013.01); *B25J 9/0081* (2013.01); *B25J 9/163* (2013.01); *B25J 9/1689* (2013.01); *G06T 19/006* (2013.01)

(58) Field of Classification Search
 CPC ........ B25J 9/1671; B25J 9/163; B25J 9/0081; B25J 9/1689; G06T 19/006
 (Continued)

(56) References Cited

U.S. PATENT DOCUMENTS

| 4,587,618 A | 5/1986 | Oguchi |
| 4,594,671 A * | 6/1986 | Sugimoto ............ G05B 19/416 318/568.18 |

(Continued)

FOREIGN PATENT DOCUMENTS

| JP | H08234824 A | 9/1996 |
| KR | 20070071316 A | 7/2007 |

OTHER PUBLICATIONS

Shen, Y. et al. "Asymptomatic Trajectory Tracking of Manipulators Using Uncalibrated Visual Feedback." IEEE/ASME Transactions on Mechatronics, vol. 8, No. 1, Mar. 2003, pp. 87-97.

(Continued)

*Primary Examiner* — B M M Hannan
(74) *Attorney, Agent, or Firm* — John A. Miller; Shumaker, Loop & Kendrick, LLP

(57) ABSTRACT

A method and system for programming a path-following robot to perform an operation along a continuous path while accounting for process equipment characteristics. The method eliminates the use of manual teaching cycles. In one example, a dispensing robot is programmed to apply a consistent bead of material, such as adhesive or sealant, along the continuous path. A computer-generated definition of the path, along with a model of dispensing equipment characteristics, are provided to an optimization routine. The optimization routine iteratively calculates robot tool center point path and velocity, and material flow, until an optimum solution is found. The optimized robot motion and dispensing equipment commands are then provided to an augmented reality (AR) system which allows a user to visualize and adjust the operation while viewing an AR simulation of dispensing system actions and a simulated material bead. Other examples include robotic welding or cutting along a continuous path.

20 Claims, 2 Drawing Sheets

(58) Field of Classification Search
USPC ........................................................ 700/245
See application file for complete search history.

(56) References Cited

U.S. PATENT DOCUMENTS

| | | | |
|---|---|---|---|
| 4,616,326 A | 10/1986 | Meier et al. | |
| 4,675,502 A * | 6/1987 | Haefner ................. | B25J 9/1684 219/124.34 |
| 4,819,184 A | 4/1989 | Jonsson et al. | |
| 5,396,160 A * | 3/1995 | Chen ...................... | B25J 9/1664 318/571 |
| 8,190,295 B1 | 5/2012 | Garretson et al. | |
| 8,911,237 B2 * | 12/2014 | Postlethwaite ........ | G09B 19/24 434/234 |
| 9,731,419 B2 * | 8/2017 | Halsmer ................. | B25J 9/1656 |
| 10,913,125 B2 * | 2/2021 | Meess ...................... | A61F 9/06 |
| 2005/0149231 A1 * | 7/2005 | Pretlove ................. | B25J 9/1671 700/264 |
| 2013/0116828 A1 | 5/2013 | Krause et al. | |
| 2014/0081441 A1 | 3/2014 | Regan et al. | |
| 2014/0371905 A1 | 12/2014 | Eberst et al. | |
| 2015/0336267 A1 | 11/2015 | Sun et al. | |
| 2016/0207198 A1 | 7/2016 | Willfor et al. | |
| 2017/0232615 A1 * | 8/2017 | Hammock ............ | B23K 26/032 700/119 |
| 2018/0173192 A1 * | 6/2018 | Atherton ............... | G05B 19/188 |
| 2020/0030979 A1 * | 1/2020 | Bank ........................ | B25J 13/08 |

OTHER PUBLICATIONS

PCT International Search Report of the International Searching Authority dated Oct. 28, 2019 and dated Nov. 20, 2019 for International Application No. PCT/US2019/050468 filed Sep. 10, 2019.

* cited by examiner

ZERO TEACH FOR ROBOTIC CONTINUOUS PATH

CROSS-REFERENCE TO RELATED APPLICATIONS

This application claims the benefit of the priority date of U.S. Provisional Patent Application Ser. No. 62/729,179, titled ZERO TEACH FOR ROBOTIC CONTINUOUS PATH, filed Sep. 10, 2018.

BACKGROUND

Field

The present disclosure relates to the field of industrial robots and, more particularly, to a method for programming a robot to follow a prescribed continuous path along a part with no manual teaching cycles, where CAD data defining the prescribed continuous path and process equipment characteristics are provided as input to an optimization process, and the optimized path and result of the operation performed by the robot are displayed for verification and further adjustment in an augmented reality system.

Discussion of the Related Art

The use of robots to consistently perform industrial operations which involve accurately following a path is known in the art. One example of a path following application is where a robot is used to apply a "bead" of material—such as caulk, sealant or adhesive—to a part along a prescribed path. However, until now, the programming of the robot to precisely follow the prescribed path while applying a consistent bead of the material has been a trial and error process. This is because the tool center point of the robot, which is the applicator tip in the case of a dispensing application, moves at different speeds in a straight line than in tight curves and corners. If the rate of material dispensing is not adjusted to compensate for tool center point speed, then the bead of material will have different thicknesses at different points along the path, which is undesirable.

Robots are also used for many other path following operations—such as welding, cutting, tracing, spray painting, etc. In any of these applications where a tool center point needs to following a prescribed path while performing an operation, the interactions of the robot tool center point position, velocity and the process equipment characteristics are important.

The use of augmented reality (AR) systems with industrial robots is also known. AR systems provide a virtual display of computer-generated elements superimposed on camera images of real-world objects, allowing an operator to visualize robotic system configuration parameters and actual performance. However, in the area of path following, AR systems have simply been used for manual teaching using the trial and error approach discussed above.

In light of the circumstances described above, it is desired to provide a method of programming a robot to consistently perform an operation along a continuous path, without manual teaching cycles.

SUMMARY

In accordance with the teachings of the present disclosure, a method and system for programming a robotic continuous path without trial-and-error teaching cycles is described. CAD data defining a prescribed continuous path, and a process equipment characteristics model, are provided as input to an optimization calculation. The optimization process iteratively computes and adjusts robot motion commands until the prescribed continuous path is faithfully followed in simulations of the tool center point motion, and a resulting velocity profile has desired characteristics including a minimal amount of velocity fluctuations. Process equipment control signals corresponding to the robot motion commands are also calculated. The outputs of the optimization process are provided to an augmented reality system, where the optimized path and the result of the operation performed by the robot are displayed for verification and further adjustment by an operator.

Additional features of the presently disclosed techniques will become apparent from the following description and appended claims, taken in conjunction with the accompanying drawings.

DETAILED DESCRIPTION OF THE EMBODIMENTS

The following discussion of the embodiments of the disclosure directed to a method and system for programming a robotic continuous path without trial-and-error teaching cycles is merely exemplary in nature, and is in no way intended to limit the disclosed devices and techniques or their applications or uses.

Industrial robots are very good at performing repetitive tasks consistently. In particular, robots are capable of following almost any path which can be defined in two or three dimensions. This has given rise to the use of robots for various path-following operations—such as welding, cutting, spray painting and material dispensing. In order to illustrate the problems associated with known trial-and-error teaching methods for robotic path-following operations, and the advantages of the presently disclosed techniques, the material dispensing application will be discussed in detail below as an example.

One industrial operation for which robots have been configured is application of a bead of material—such as adhesive, caulk or sealant—along a prescribed path on a part. An industrial robot, such as a six-axis robot known in the art, is fitted with a material dispensing system. In simple terms, the dispensing system may include a dispenser such as a pump or a canister with a plunger, a dispensing tip, and a supply line running from the dispenser to the dispensing tip. The dispensing tip is the "tool center point" which the robot must move along the prescribed path while the dispenser follows commands (such as on/off and material flow rate).

The dispensing robot arrangement described above is known to provide repeatable application of the bead of material along the path on the part, but in order to get a consistent bead of material (constant width along the entire path) with no deviation from the path, trial and error robot teaching has traditionally been required. This is because the robot naturally moves the dispensing tip at different speeds as it encounters curves and corners along the path. In addition, robot path-following calculation algorithms often result in significant velocity fluctuations along the path. These different dispensing tip speeds cause the thickness of the dispensed bead to increase and decrease, which is undesirable. The trial and error robot teaching approach is undesirably expensive and time-consuming, which has led to the development of the new technique disclosed herein.

Figure 1:
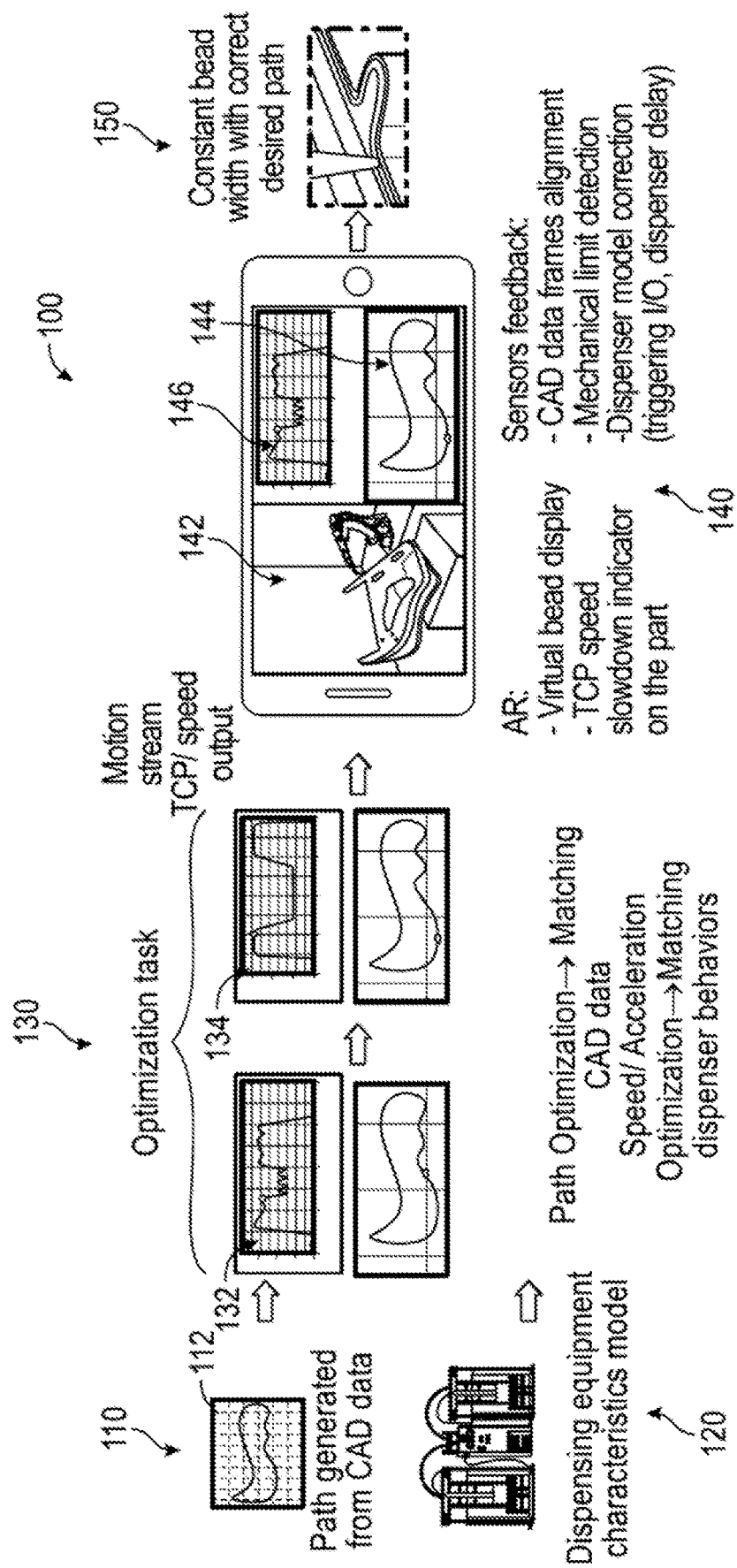
FIG. 1 is schematic flow diagram illustrating a technique for programming a dispensing robot to apply a consistent bead of material along a continuous path, according to an embodiment of the present disclosure.

FIG. 1 is schematic flow diagram 100 illustrating a technique for programming a dispensing robot to apply a consistent bead of material along a continuous path, according to embodiments of the present disclosure. At step 110, a geometric definition of a path 112 to be followed on a part is provided, typically from a CAD system. The path 112, for example, might be an irregularly shaped periphery of a machined casting, where a bead of sealant is to be applied around the periphery before another part is attached to the casting. The path 112 may be two-dimensional or three-dimensional. The path 112 is typically comprised of numerous points, with blending curves fitted through the points. The path 112 may also include definition of a required tool orientation angle. For example, in the case of a dispensing application onto a planar oval-shaped path, the requirement may be that the dispenser tip is oriented at a 45° angle above the plane of the path (plus or minus some tolerance), always normal to a local tangent of the path (again, plus or minus some tolerance from perpendicular), and the dispenser tip is always positioned outside the path. The tool orientation requirement may be defined as a property of the entire path 112, or as a specific property associated with each path point.

At step 120, a model of dispensing equipment characteristics is provided. The dispensing equipment characteristics model includes a relationship between an input signal to the dispensing equipment (such as a pump flow setting ranging from 0-10) and an output parameter (such as a volume flow rate of the dispensed material in cubic centimeters per second). The relationship between the input signal and the output parameter may be nonlinear, and may be described as a mathematical equation, a set of parametric curves, a table of values, or any other suitable format. The dispensing equipment characteristics model also includes a time lag between a change in input signal to the dispenser/pump and an actual change in flow rate at the dispenser tip. Because of the length of the supply line (from the dispenser to the dispensing tip), the compressible flow properties of the dispensed material, and other factors, there is a time lag between the time when the "dispenser on" signal is provided and the time when the material actually begins to flow out of the dispenser tip. Likewise, there is a time lag after a "dispenser off" signal, and a time lag after a change of flow rate signal. Flow rate change commands are particularly relevant, as they must be performed any time the dispenser tip velocity changes as the tip follows the path. Flow rate change lag times may not be constant, but instead they may be a function of flow rate, where lag times are longer when flow rate is lower, for example. These time lags can be characterized for a particular robot and dispenser system; this is what is contained in the model of dispensing equipment characteristics.

An optimization task is performed at step 130. Using the geometric definition of the path 112 and other input parameters such as a required dispenser tip orientation, an initial robot motion simulation can be calculated, as shown at 132. The initial simulation may have very uneven tip velocities (shown at 132, upper graph), and may overshoot or undershoot the desired path 112 (shown at 132, lower graph). An iterative calculation of the robot motion simulation is performed in the optimization task of the step 130, eventually resulting in a much smoother velocity profile (shown at 134, upper graph) and a precise match of the desired path 112 (shown at 134, lower graph).

Based on the optimum tip motion simulation and the dispensing equipment characteristics model, dispensing equipment commands can be computed to match the tip position and velocity. For example, the dispenser may be commanded to begin flow 200 milliseconds (ms) before the robot begins moving the dispenser tip along the path 112, and dispenser flow rate can be adjusted downward at a time 200 ms (or more or less, depending on the characteristics model) before the tip velocity decreases. In one example, the volume flow rate of the dispensed material is a linear function of the dispensing tip velocity, where higher flow rates are used at higher velocities.

The optimization task at the step 130 can be executed during a simulation phase with the consideration of robotic path planning and the characteristics of the process equipment. The objective function of this iterative optimization process includes the minimal path deviation between the generated motion commands and CAD model and the minimal tool center point (TCP) speed variation for process equipment. Other process-related objectives such as tool orientation may also be included in the optimization calculation. This offline optimization process provides controllable results for the next step using AR devices. When the target of the objective function is achieved, the robot motion commands and corresponding processing equipment command signals are provided to a robot controller.

The robot controller then runs the robot through a dry-run operation using the output of the optimization process, and the dry-run operation is viewed by an operator using an augmented reality (AR) system. At step 140 of FIG. 1, a simulation of the AR system display is shown. This display may be a set of AR goggles, or a display on a tablet device. In one embodiment, the AR display includes a split screen, with an image of the actual robot and part including virtual overlays on the left, and position and velocity traces on the right.

On the left side of the AR display and shown at 142, the actual part, which is physically located in front of the AR user, is displayed as images from the AR device camera. The actual robot is commanded to perform the dry run of the dispensing operation using the optimized motion commands. That is, the actual robot actually moves the dispenser tip along the prescribed path, but the dispensing equipment is not turned on for the AR simulation, or the dispensing equipment may be turned on but without any material in the dispenser. As the robot traces the desired path, a virtual bead of material (calculated based on dispensing equipment commands and characteristics, and dispenser tip velocity) is displayed in the AR system so that the user can verify its uniformity. Tool center point velocity (such as a number of mm/sec) is also overlaid on the AR display at 142, with corresponding display of slowdowns.

On the right side of the AR display, trace points follow along the position (shown at 144) and velocity (shown at 146) curves in synchronization with the robot tip motion on the actual part. The AR user can confirm the robot motion commands and dispensing equipment commands, and/or can make final adjustments based on AR system feedback. The feedback may include actual path alignment with the CAD prescribed path, robot joint mechanical limit detection, and observation of the virtual bead which could require adjustments to the dispensing equipment model or commands.

The AR display allows the operator to verify all aspects of the simulated robotic operation performed on a real workpiece. In particular, mismatches between the theoretical path and the real workpiece may be identified in two main areas; differences between the shape of the CAD-defined part and the shape of the real workpiece (a path along a real manufactured part may have slight differences in shape from the theoretical CAD path), and differences between the theoretical position and orientation of the workpiece relative to the robot base coordinate system and the actual position and orientation of the workpiece (i.e., fixturing alignment tolerances or errors).

After any final adjustments which the operator may make to the robot motion and/or the dispensing equipment commands based on the AR simulation, the verified robot motion commands and dispensing equipment commands are approved for use in the production process, as shown at step 150.

Figure 2:
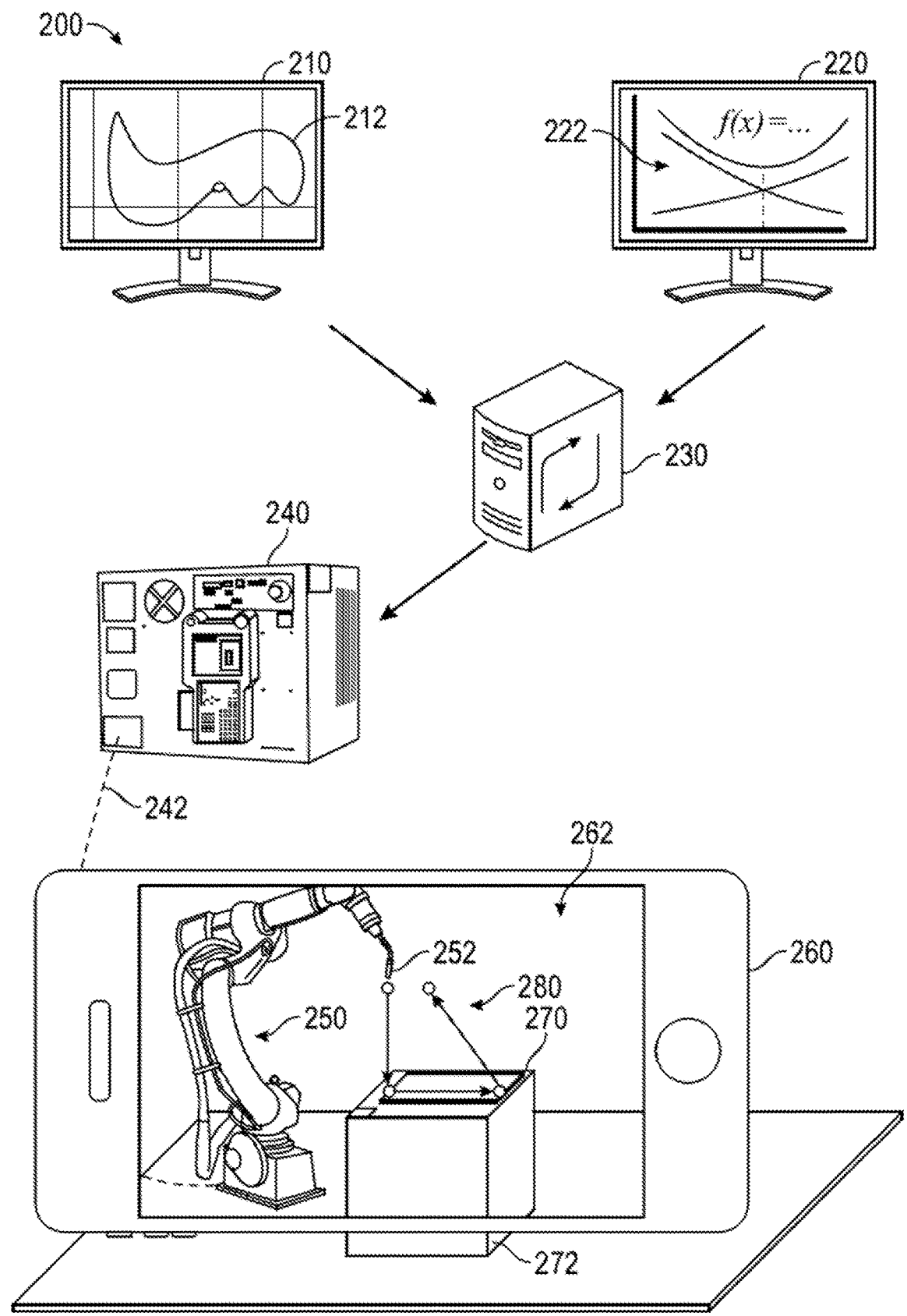
FIG. 2 is an illustration of a system for zero teach programming of a robotic continuous path using augmented reality, according to an embodiment of the present disclosure.

FIG. 2 is an illustration of a system 200 for zero teach programming of a robotic continuous path using augmented reality, according to an embodiment of the present disclosure. A CAD computer system 210 provides a design path 212 describing the theoretical path to be followed by the robot tool center. An engineering computer system 220 provides a model 222 of process equipment characteristics, such as dispensing equipment lag time and flow vs. input value, or weld torch energy vs. input value. The design path 212 and the characteristics model 222 are provided to a computer 230 where the iterative optimization process is performed as discuss above. It should be understood by one skilled in the art that the CAD computer system 210, the engineering computer system 220 and the computer 230 may be any combination of client computers, servers, data storage devices, etc. For example, the CAD system 210 may be a deskside client computer, the engineering computer system 220 and the computer 230 may be a compute server located in a server room, and all of the data from all of the computers may be stored on a storage area network.

The optimization process performed on the computer 230 results in an optimized set of robot motion commands to cause the tool center point to follow the design path 212 while minimizing fluctuations in tool center point velocity. To achieve this, an objective function may be defined which includes deviation from the design path 212 and fluctuations in tool center point velocity, where the goal of the optimization process is minimization of the objective function. The optimized set of robot motion commands may also conform to additional requirements—such as tool orientation being normal to a local tangent of the path shape, for example. The optimization computation also provides a set of process equipment input signals or commands corresponding to the tool center point position and velocity. The process equipment input signals include, for example, on and off signals and changes in flow rate or power.

The optimization process may use a known inverse kinematics algorithm to compute robot joint angles and velocities needed to achieve the prescribe path, and may adjust path point locations, segment termination types (transitions from one curve segment to another), and other path related parameters, and also adjust process related parameters such as process anticipate time, flow rate, and others to match processes deliverables such as the constant dispensing bead width and desired path.

The optimized set of robot motion commands and the corresponding set of process equipment input signals are provided to a robot controller 240. The robot controller 240 communicates with a robot 250, typically via a cable 242. The robot controller 240 is a computing device with a processor and memory with instructions for operating the robot 250 according to a program (the optimized set of robot motion commands), where the controller 240 receives position information from joint encoders on the robot 250 and sends commands to the robot 250 defining joint motor motion.

An augmented reality (AR) device 260 is used by an operator for visualization, final modification (if necessary) and verification of the optimized robot motions and process equipment command signals. The AR device 260 may be a smart phone or tablet device held by the operator, or a headset apparatus worn by the operator. The robot 250 is visible in a display 262 on the AR device 260, as would be seen by the operator. Also visible in the display 262 is a workpiece 270 placed on a fixture 272. The workpiece 270 and the fixture 272 are simplified in FIG. 2 for the sake of visual clarity. In actual implementation, the workpiece 270 may be a complex casting and the fixture 272 similarly complex. In many such implementations, the design path 212 follows a three-dimensional feature of the workpiece 270.

As discussed earlier, the display 262 may include a split-screen format showing the actual/virtual scene on one side and traces of tool center point position and velocity on the other side. The actual/virtual scene shown in FIG. 2 includes images of the actual robot 250 actually moving a tool center point 252 through the prescribed motions. The actual/virtual scene also includes a virtual display of the process output (not shown in FIG. 2)—such as a bead of dispensed material. The bead of dispensed material is computed from the tool center point position and velocity, the corresponding process equipment input signals and the process equipment characteristics model, and is displayed as being laid down in real time as the tool center point 252 follows the path along the workpiece 270. The actual/virtual scene may also include other features typical of AR system displays, such as a virtual display of an overall tool center point path 280 including approach and departure routings.

As discussed above with respect to the step 140 of FIG. 1, the operator may make final adjustments to the robot motion commands and the process equipment command signals while interacting with the AR device 260. The final adjustments may include moving a path point to account for a variation between the CAD part and the actual workpiece 270, and/or adjusting a position or orientation (in any of the six degrees of freedom) of the optimized tool center path to account for a variation between the theoretical and actual fixture position of the workpiece 270 relative to the robot 250.

The AR application running on the AR device 260 may also record video of the display 262 so that the results—such as the placement and thickness of the bead of caulk on the workpiece 270—may be evaluated in detail before confirming the robot motion commands and the process equipment command signals for production operations. Further adjustments to the robot motion program and the process equipment command signals may be made after viewing the video.

When the AR device 260 is a headset, the headset includes a processor, inertial sensors, a camera and goggles which overlay computer-generated 3D images on top of the user's view or camera images of real-world objects. The AR device 260 may also be a handheld device such as a mobile phone, a tablet device or a robot teach pendant, in which case the device 260 still includes a processor, inertial sensors, a camera and a display screen, in addition to the required communications system. The AR application program provides augmented reality features and functions to the operator as discussed previously.

The AR device 260 is in wireless communication with the robot controller 240 so that the AR application program and the robot control program can maintain a two-way exchange of data. At a minimum, the AR application program receives the process equipment command signals from the controller 240 which enables the AR application program to compute the process equipment output (e.g., thickness of the bead of caulk), while the known location and orientation of the AR device 260 enable the AR application to properly display the bead of caulk (for example) relative to the workpiece 270. The AR application program can also communicate changes to the robot motion program back to the controller 240 to be saved as a modified version. The location and orientation of the AR device 260 with respect to the robot 250 are known through a combination of visual image processing and visual and inertial odometry, or any other suitable technique as known in the art. The wireless communication between the AR device 260 and the controller 240 may be via a wireless local area network (WiFi), Bluetooth, cellular communication or any other suitable wireless technology.

In summary, the process shown in FIG. 1 and the system shown in FIG. 2 provide a virtual path planning technique which reflects robotic path behaviors such as corner rounding and process equipment characteristics such as flow rate and lag time, where the AR application allows the operator to visualize and verify the results without turning on the actual dispensing process.

The preceding detailed discussion of a material dispensing robot is just one example of a path-following robotic operation. It can easily be envisioned how another example, welding along a path, exhibits the same problems with the prior art methods and the same benefits of the disclosed techniques. In a path welding operation, the continuous prescribed path may be where the edges of two parts touch. The prescribed path could have any three dimensional shape associated with the edges of the parts. A welding electrode or torch represents the tool center point that must follow the prescribed path, and also may have a required tip orientation angle as the electrode/torch moves along the path. Just as in the case of material dispensing, the welding operation is sensitive to tool center point velocity, as weld bead properties are a function of both velocity and welding current/energy. Thus, a path-following robotic welder can also benefit from the disclosed methods, where the path is optimized with no overshoot or undershoot and a smooth velocity profile, the required orientation is maintained, the process equipment's characteristics (electrode current or torch gas flow) are computed as a function of robot tool center motion and incorporated into an AR model, and the resulting path and weld bead are verified and used in production.

Other examples of robotic path-following—such as cutting (e.g., laser cutting of metal—where laser energy level, distance from workpiece, velocity, orientation angle and metal thickness all impact performance) and spray painting (spray pressure or flow rate along a prescribed path, distance and orientation relative to a vehicle body panel, for example)—can similarly benefit from the zero teach continuous path optimization techniques of the present disclosure.

Throughout the preceding discussion, various computers and controllers are described and implied. It is to be understood that the software applications and modules of these computer and controllers are executed on one or more computing devices having a processor and a memory module. In particular, this includes processors in the computers 210-230, the robot controller 240 and the mobile device 260 discussed above. Communication between these devices, and between these devices and any other devices (such as a tablet device, a teach pendant or a factory master controller) may be over a hard-wire network, or may use any suitable wireless technology—such as a cellular phone/data network, Wi-Fi, broadband Internet, Bluetooth, etc.

As outlined above, the disclosed techniques for zero teach programming of a robotic continuous path using augmented reality offer several advantages over prior art techniques. The ability to compute an optimized path with corresponding process equipment control commands to produce a faithfully followed path and consistent process results, and then visualize and adjust the path and process using augmented reality, is far superior to prior trial-and-error techniques for continuous path programming.

While a number of exemplary aspects and embodiments of the method and system for zero teach programming of a robotic continuous path using augmented reality have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A system for programming a robot to perform an operation along a continuous path, said system comprising:
   a computer with a processor and memory configured with an optimization algorithm, said optimization algorithm using inputs including a design path and a process equipment characteristics model and performing an iterative calculation of robot motion commands to achieve an objective function including robot tool center path and velocity, and corresponding process equipment command signals;
   an industrial robot fitted with process equipment to perform the operation;
   a robot controller in communication with the robot and the computer, said controller including a processor and memory and being configured with robot operational control software; and
   an augmented reality (AR) device in communication with the robot controller, said AR device having one or more cameras, position tracking sensors and a display, said AR device further including a processor and memory configured to run an AR application,
   where the robot controller receives the robot motion commands and the corresponding process equipment command signals from the computer and commands the robot to perform a dry-run procedure,
   and the AR application displays the dry-run procedure of the robot with a simulated output of the operation superimposed on a workpiece.

2. The system according to claim 1, wherein the AR device is a headset apparatus worn by an operator, or the AR device is a smart phone, a tablet computing device or a robot teach pendant held by the operator.

3. The system according to claim 1, wherein the design path is defined by data from a Computer Aided Design (CAD) system.

4. The system according to claim 1, wherein the process equipment characteristics model includes a physical output quantity as a function of an input level signal, and output time lags experienced after receiving on/off event signals and input level signal changes.

5. The system according to claim 1, wherein the AR application displays the dry-run procedure of the robot with the simulated output of the operation superimposed on the workpiece on one side of a split-screen display, and displays a path trace and tool tip velocity curves on the other side of the split-screen display, where the path trace and tool tip velocity curves include a trace point which moves in synchronization with tool tip motion of the robot.

6. The system according to claim 1, wherein the optimization algorithm uses an inverse kinematics calculation to compute the robot motion commands based on the design path, and adjusts path points and path segment parameters as necessary to minimize the objective function.

7. The system according to claim 1, wherein the optimization algorithm also receives a tool orientation requirement input and includes tool orientation in the objective function.

8. The system according to claim 1, wherein the AR application enables an AR operator to make changes to the robot tool center path and the corresponding process equipment command signals.

9. The system according to claim 1, wherein the operation is dispensing a bead of material along the continuous path on the workpiece, and the AR application displays the simulated output of the bead of material as a dispensing tip on the robot moves along the workpiece.

10. The system according to claim 1, wherein the operation is welding one or more workpieces along the continuous path, cutting the workpiece along the continuous path, or spray painting the workpiece by following the continuous path.

11. A method for programming a robot to perform an operation along a continuous path, said method comprising:
providing inputs including a design path and a process equipment characteristics model to a computer with a processor and memory configured with an optimization algorithm;
running the optimization algorithm using the inputs, including performing an iterative calculation of robot motion commands to achieve an objective function including robot tool center path and velocity, and computing corresponding process equipment command signals;
operating the robot fitted with process equipment to perform a dry run of the operation, by a robot controller based on the robot motion commands and the corresponding process equipment command signals received from the computer; and
viewing the dry run of the operation in an augmented reality (AR) application running on an AR device, including displaying the robot performing the dry run of the operation with a simulated output of the operation superimposed on a workpiece.

12. The method according to claim 11, wherein the optimization algorithm uses an inverse kinematics calculation to compute the robot motion commands based on the design path, and adjusts path points and path segment parameters as necessary to minimize the objective function.

13. The method according to claim 11, wherein the optimization algorithm also receives a tool orientation requirement input and includes tool orientation in the objective function.

14. The method according to claim 11, further comprising making changes to the robot tool center path and the corresponding process equipment command signals by an AR operator using the AR application.

15. The method according to claim 14, further comprising making a video recording of the dry run of the operation with the simulated output by the AR application, viewing the video recording by the AR operator, and making the changes.

16. The method according to claim 11, wherein the AR device is a headset apparatus worn by an operator, or the AR device is a smart phone, a tablet computing device or a robot teach pendant held by the operator.

17. The method according to claim 11, wherein the process equipment characteristics model includes a physical output quantity as a function of an input level signal, and output time lags experienced after receiving on/off event signals and input level signal changes.

18. The method according to claim 11, wherein the operation is dispensing a bead of material along the continuous path on the workpiece, and the AR application displays the simulated output of the bead of material as a dispensing tip on the robot moves along the workpiece.

19. The method according to claim 11, wherein the operation is welding one or more workpieces along the continuous path, cutting the workpiece along the continuous path, or spray painting the workpiece by following the continuous path.

20. A method for programming a robot to perform an operation along a continuous path including performing an iterative optimization calculation of robot motion commands to minimize an objective function including tool path deviation and tool tip speed variation, providing the robot motion commands and process equipment command signals to a robot controller, operating the robot using the robot motion commands and the process equipment command signals, and viewing the operation using an augmented reality (AR) application, where the AR application displays the robot performing a dry run of the operation with a simulated output of the operation superimposed on a workpiece.

* * * * *